United States Patent [19]
van der Merwe et al.

[11] Patent Number: 4,867,131
[45] Date of Patent: Sep. 19, 1989

[54] COMBINED HEATING DISH AND STORAGE CONTAINER FOR FOOD

[76] Inventors: Jacobus C. van der Merwe; Lucas C. van der Merwe, both of 801 Beechwood Dr., Kingsport, Tenn. 37663; Johannes Horn, Daimler Straze 12, Ladenburg, 6802, Fed. Rep. of Germany

[21] Appl. No.: 317,445

[22] Filed: Mar. 1, 1989

[51] Int. Cl.$^4$ ................................................. F24J 1/00
[52] U.S. Cl. .................................... 126/263; 426/114
[58] Field of Search .................. 126/263; 426/113, 114

[56] References Cited

U.S. PATENT DOCUMENTS

| | | |
|---|---|---|
| 3,871,357 | 3/1975 | Grosso et al. |
| 3,903,011 | 9/1975 | Donnelly |
| 3,970,068 | 7/1976 | Sato |
| 4,067,313 | 1/1978 | Donnelly |
| 4,501,259 | 2/1985 | Apellaniz |
| 4,762,113 | 8/1988 | Hamasaki ........................... 126/263 |

Primary Examiner—Carroll B. Dority, Jr.
Attorney, Agent, or Firm—Fleit, Jacobson, Cohn, Price, Holman & Stern

[57] ABSTRACT

This invention relates to a combined heating dish and storage container comprising an outer container formed of insulating material for low heat conduction. The outer container includes a first recess centrally formed in a surface of the outer container and a second recess formed in the surface and disposed at one lateral side of the first recess. A water filled bag is received within the first recess, and a layer of dehydrated lime provided within the first recess in an amount sufficient to cover the water filled bag. A food containing package is placed on the layer of dehydrated lime and received within the first recess. A ripcord for releasing water from the water filled bag so that the water is released and allowed to flow into the layer of lime is provided. The lime undergoes an exothermic reaction as it is exposed to the water to heat food within the food containing package. Eating utensils are disposed within the second recess so that a user may consume food which has been heated as a result of the exothermic reaction.

8 Claims, 2 Drawing Sheets

COMBINED HEATING DISH AND STORAGE CONTAINER FOR FOOD

FIELD OF THE INVENTION

This invention relates to a heating dish and storage unit for precooked food. Such a heating dish and storage unit is useful in any instance in which it is desirable to utilize a single, completely independent unit in order to store precooked food which has been packaged, and subsequently reheat the food. The invention is well-suited for use, for example, by individuals who camp or hike, or by military personnel.

DESCRIPTION OF RELATED ART

U.S. Pat. No. 4,501,259 discloses one such device for storing and heating food. The device includes a sealed container filled with food which is surrounded by an annular chamber containing quicklime and water separated by a wall which is pierced or torn to allow contact of the water with the quicklime. When the wall which separates the quicklime and water is pierced or torn, an exothermic reaction is caused which heats the food in the sealed container.

SUMMARY OF THE INVENTION

Although the above U.S. Patent does disclose a self-contained food heating and storage unit, no provision has been made in the device for utensils which can be used by an individual to consume the food once the unit has been taken out of storage and the food has been heated. Moreover, in order to pierce or tear the wall of the device, it is necessary to utilize a separate, pointed tool. The utensils, the pointed tool, or both, however, may not be readily available to a user at all times.

It is accordingly one object of the present invention to provide a totally self-contained heating dish and storage container for food, of simplified construction, in which provision has been made for such utensils.

It is a further object of the invention to provide such a self-contained combined food heating dish and storage container in which it is unnecessary to utilize an auxiliary device, such as a pointed tool, in order to effect heating of the stored food.

The above objects, among others, are achieved by the provision of a combined heating dish and storage container including an outer container formed of insulating material for low heat conduction. The outer container includes a first recess centrally formed in a surface of the outer container and a second recess formed in the surface and disposed at one lateral side of the first recess. A water filled bag is received within the first recess, and a layer of dehydrated lime is provided within the first recess in an amount sufficient to cover the water filled bag. A food containing package is placed on the layer of dehydrated lime and received within the first recess. A ripcord for releasing water from the water filled bag so that the water is released and allowed to flow into the layer of lime is provided. The lime undergoes an exothermic reaction as it is exposed to the water to heat food within the food containing package. Eating utensils are disposed within the second recess so that a user may consume food which has been heated as a result of the exothermic reaction.

DETAILED DESCRIPTION OF THE PREFERRED EMBODIMENT

Figure 1:
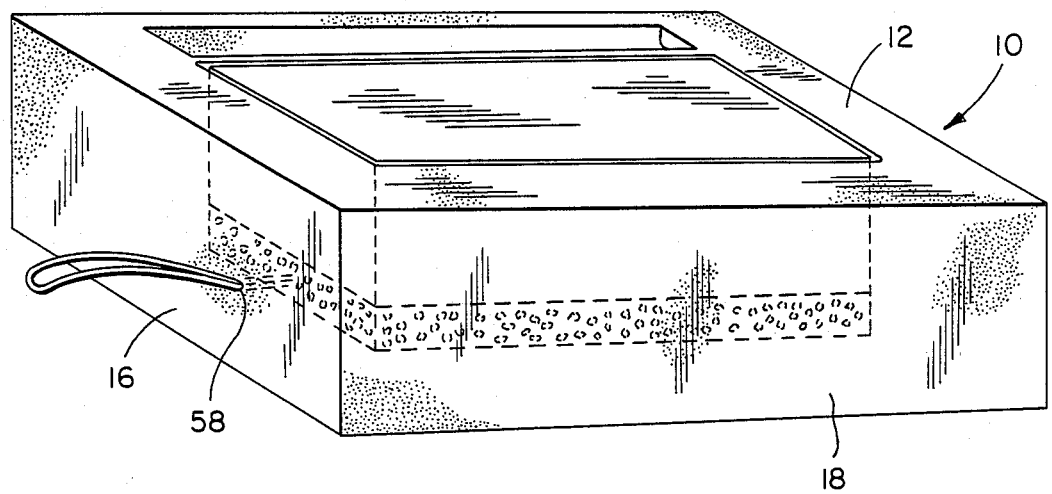
FIG. 1 is a perspective view of the combined food heating dish and storage container according to the invention.

Referring to FIG. 1, the combined food heating dish and storage container is formed by an outer container 10. Outer container 10 is preferably formed of polystyrene or other suitable low heat conducting, insulating material and may be injection molded or otherwise formed in a conventional manner into the illustrated configuration. As can best be seen from FIGS. 2 and 3, outer container 10, in the preferred embodiment, has the form of a six sided solid and preferably has the general shape of a rectangular box for easy stacking and storage. The outer container 10, as shown, has a top surface 12, a bottom surface 14, a pair of shorter side surfaces 16 and a pair of longer side surfaces 18.

Formed within top surface 12 of container 10 is a pair of elongated, parallel, upwardly opening recesses 20 and 22. Recess 20 is formed centrally in top surface 12, while recess 22 is formed in top surface 12 to one lateral side of recess 20. Recesses 20 and 22, as illustrated, extend from top surface 12 toward bottom surface 14. The centrally formed recess 20 is formed with a substantially greater volume than the volume of recess 22 and forms peripheral container walls 24 and a bottom container wall 26.

A waterproof plastic bag 30 is disposed within the centrally formed recess 20. Bag 30 is filled with water and may be formed of any appropriate water-impermeable plastic material, such as polyethylene. Bag 30 may be secured to the bottom surface 32 of centrally formed recess 20 by tape 34, which is coated on each side with an adhesive.

A ripcord 36 has at least one end affixed to bag 30 for a purpose to be described later. In the illustrated embodiment, opposite ends 38 and 40 of the ripcord are both secured to the bag so that the central portion of the ripcord forms a loop 42. Ends 38 and 40 of the ripcord may be molded into bag 30 when the bag is formed, or, alternatively, may be adhesively secured to the bag. At three sides of the location at which ripcord 36 is secured to bag 30, bag 30 is provided with score lines 44 on its surface for a purpose which will soon become apparent. Score lines 44 define sides of a flap 46 on bag 30.

A layer 48 of material, which in the illustrated embodiment is dehydrated lime (i.e. calcium oxide), is provided within recess 20 and partially fills the recess. Recess 20 is filled with a sufficient amount of dehydrated lime to surround the sealed plastic bag 30. It has been found that a water to lime weight ratio of about 2½ to 1 works well.

Also located within recess 20 is a food containing package 50. Package 50, in the illustrated embodiment, is formed by an aluminum or tin foil sheet 52 folded about precooked food 54, which is to be stored and subsequently reheated. After sheet 52 is folded about the precooked food, the sheet is sealed in any conventional manner, such as by heat sealing, to prevent the food from being exposed to the atmosphere. The food, such as meat and vegetables, is cooked and then packed and sealed hot. The food is thus sterilized before it is sealed in the foil sheet 52.

Figure 3:
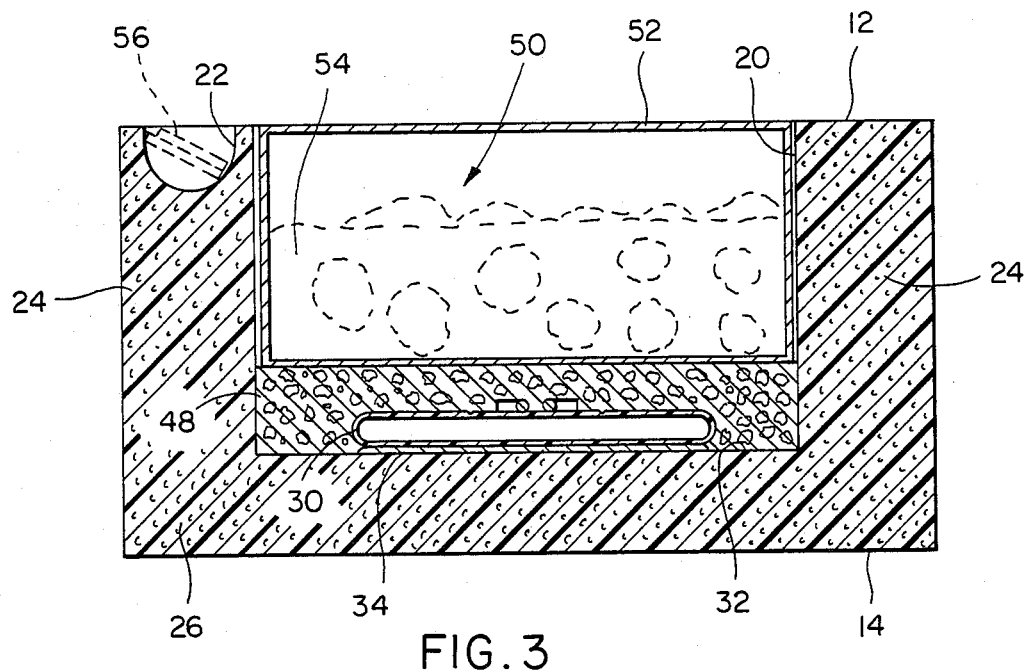
FIG. 3 is a sectional view of the heating dish and storage container as it appears along section line 3—3 of FIG. 2.
Figure 4:
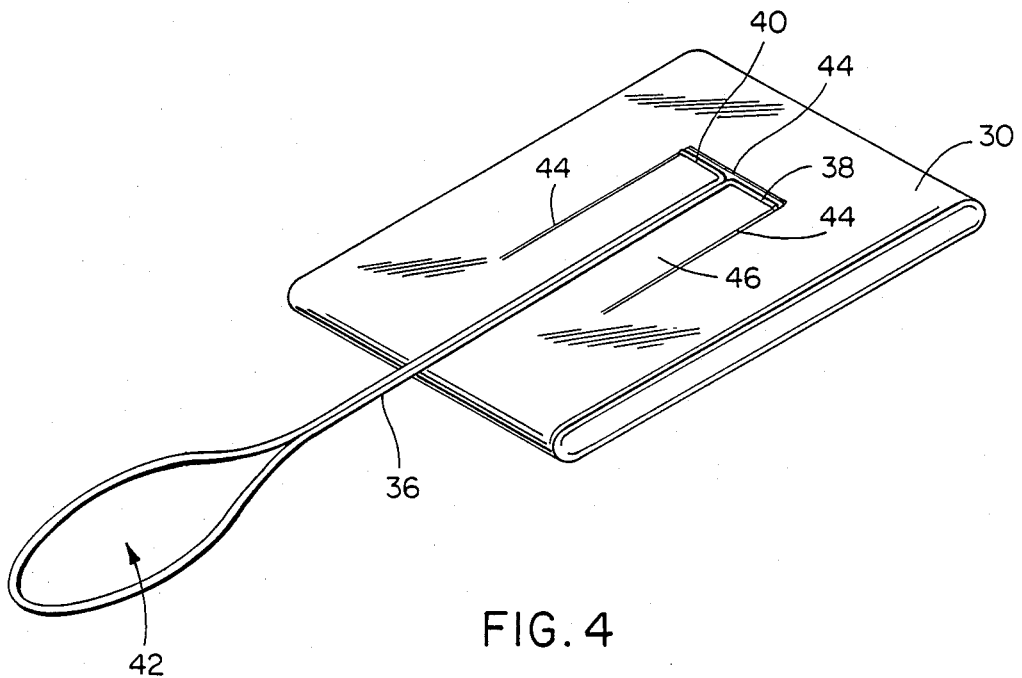
FIG. 4 is a perspective view of the bag illustrated in phantom in FIG. 2 and in section in FIG. 3.

As FIGS. 1 and 3 illustrate, the aluminum or tin foil package 50 is placed on top of layer 48 of dehydrated lime. A sufficient amount of dehydrated lime is filled into recess 20 to completely cover sealed plastic bag 30. However, in order to make it easy to stack and store a plurality of containers 10, the amount of lime filled into recess 30 is preferably limited so that the top of package 50 does not protrude above top surface 12 of container 10.

As described above, recess 22 is formed in top surface 12 of container 10 so that it is adjacent and extends parallel to recess 20. Recess 22 is shallow relative to recess 20 and has a smaller volume than recess 20. Eating utensils 56, such as knife and fork, are disposed in recess 22. Since recess 22 is shallow, utensils 56 may be grasped easily by a user when desired. Recess 22 is preferably formed sufficiently deep so that utensils 56 do not protrude above top surface 12 of container 10.

Figure 2:
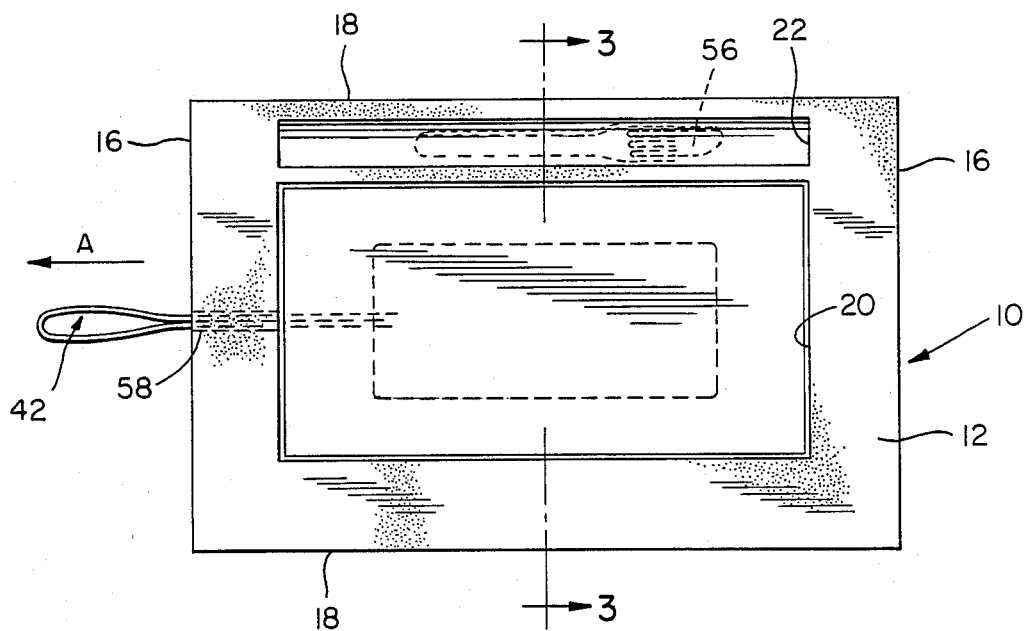
FIG. 2 is a top view of the heating dish and storage container of FIG. 1.

One of the peripheral container walls 24, which may be designated the front container wall, is provided with a bore 58 extending completely through the wall from its outer side surface to recess 20. After sealed plastic bag 30 has been filled with water and adhesively secured by tape 34 to the bottom surface of recess 20, loop 42 of ripcord 36 is fed through bore 58 so that the loop is disposed outside the container as shown in FIGS. 1 and 2.

To complete the assembly of the combined food heating dish and storage container, after loop 42 of ripcord 36 has been fed through bore 58, dehydrated lime is deposited in recess 20 so as to form layer 48. After a sufficient amount of lime has been deposited in recess 20 to cover plastic bag 30, package 50 of precooked food is placed upon layer 48 of lime. Utensils 56 are placed in recess 22, and the combined food heating dish and storage container is then completely assembled and is ready to be used to store the precooked food which has been sealed in foil package 50. The food heating dish and storage container according to the invention can be used to store food at room temperature for up to two years without refrigeration.

When the food which has been stored in foil package 50 is to be eaten, the heating dish and storage container is removed from storage. The user pulls on ripcord 36 so that the ripcord is drawn through bore 58 outwardly of the container in the direction of arrow A of FIG. 2. Since ends 38 and 40 of the ripcord are attached to bag 30 in the manner described above, as ripcord 36 is pulled in the direction of arrow A, water filled bag 30 tears along score lines 44 so that flap 46 is peeled back away from the remainder of bag 30. Adhesive coated tape 34 helps retain bag 30 in place in recess 20 as ripcord 36 is pulled. It should be apparent that loop 42 enables a user to quickly and easily grasp the ripcord by inserting a finger through the loop. The water contained in bag 30 is released and allowed to flow out of the bag so that it is absorbed into the surrounding layer 48 of dehydrated lime. The dehydrated lime undergoes an exothermic reaction as it is exposed to the water, during which the dehydrated lime is converted to calcium hydroxide. When a water to lime ratio of about $2\frac{1}{2}$ to 1 is utilized in the heating dish and storage container, heat is given off during this period of time for 11 to 12 minutes. The lime and water mixture may reach temperatures as high as 200° F. The energy given off during the exothermic reaction between the water and dehydrated lime is sufficient to heat food 54 so that within minutes, hot food is ready to be served. Since outer container 10 is formed of polystyrene or another such heat insulating material, the heat generated as the water reacts with the dehydrated lime is prevented from quickly radiating away from the container, and food 54 is therefore kept hot.

After the food has been heated sufficiently, utensils 56 can be removed from shallow recess 22 in which they are disposed and used to puncture foil package 50. The foil may be peeled manually away from food 54, and utensils 56 may then be used to consume the food. The heating dish and storage container can be made with minimal labor and is formed from relatively inexpensive materials, and may simply be discarded after the food has been consumed.

In a prototype of the present invention, the outer dimensions of outer container 10 were $7\frac{1}{2}"\times 8\frac{1}{2}"\times 3"$. The dimensions of recess 20 were $6"\times 7"\times 1\frac{1}{2}"$, while the dimensions of recess 22 were $7\frac{1}{2}"\times 1\frac{1}{4}"\times \frac{3}{4}"$.

The foregoing is to be considered as illustrative only of the principles of the invention. Since numerous modifications and changes may occur to those skilled in the art, it is not desired to limit the invention to the exact construction and operation shown and described. There may be many suitable modifications to and equivalents of the invention that fall within the scope of the invention defined by the appended claims.

We claim:

1. A combined heating dish and storage container comprising:

an outer container formed of insulating material for low heat conduction, said outer container including a first recess centrally formed in a surface of the outer container and a second recess formed in said surface and disposed at one lateral side of said first recess;

a liquid filled bag received within said first recess;

a layer of material provided within said first recess in an amount sufficient to cover said liquid filled bag;

a food containing package, placed on said layer of material and received within said first recess;

means for releasing liquid from said liquid filled bag so that the liquid is released and allowed to flow into the layer of material, said material undergoing an exothermic reaction as it is exposed to the liquid to heat food within said food containing package; and at least one eating utensil disposed within said second recess by which a user may consume food which has been heated as a result of said exothermic reaction.

2. A combined heating dish and storage container as defined by claim 1 wherein said liquid is water and said material comprises dehydrated lime.

3. A combined heating dish and storage container as defined by claim 1 wherein said means for releasing liquid from said liquid filled bag comprises:

a ripcord attached at least at one end to said liquid filled bag and extending through a bore passing from said first recess through a wall of said outer container to an outer surface of said wall, said ripcord being manually drawn through said bore by a user when liquid is to be released from said liquid filled bag to heat food within said food containing package.

4. A combined heating dish and storage container as defined by claim 3, wherein:
 a flap is defined on a surface of said liquid filled bag by score lines, said at least one end of the ripcord being secured to said flap so that as said ripcord is manually drawn through said bore, said liquid filled bag tears along said score lines and said flap is peeled back from said liquid filled bag to release the liquid into said layer of material.

5. A combined heating dish and storage container as defined by claim 4, wherein said ripcord is secured at both of its ends to said flap and a central portion of said ripcord is formed into a loop which extends through said bore.

6. A combined heating dish and storage container as defined by claim 1, wherein said outer container is formed of polystyrene.

7. A combined heating dish and storage container as defined by claim 4, wherein said liquid filled bag is adhesively secured to a surface of said first recess to retain said liquid filled bag in place as said ripcord is manually drawn through said bore.

8. A combined heating dish and storage container comprising:
 an outer container formed of insulating material for low heat conduction, said outer container including first and second elongated, substantially parallel recesses formed in a surface thereof;
 a liquid filled bag received within said first recess;
 a layer of material surrounding said liquid filled bag provided within said first recess;
 a food containing package, placed on said layer of material and received within said first recess;
 means for releasing liquid from said liquid filled bag so that the liquid is released and allowed to flow into the layer of material, said material undergoing an exothermic reaction as it is exposed to the liquid to heat food within said food containing package; and
 at least one eating utensil disposed within said second recess by which a user may consume food which has been heated as a result of said exothermic reaction.

* * * * *